US012591361B2

(12) United States Patent
Ebrahimi Afrouzi et al.

(10) Patent No.: US 12,591,361 B2
(45) Date of Patent: **\*Mar. 31, 2026**

(54) ROBOTIC FLOOR-CLEANING SYSTEM MANAGER

(71) Applicants: Ali Ebrahimi Afrouzi, Henderson, NV (US); Soroush Mehrnia, Helsingborg (SE)

(72) Inventors: Ali Ebrahimi Afrouzi, Henderson, NV (US); Soroush Mehrnia, Helsingborg (SE)

(73) Assignee: AI Incorporated, Toronto (CA)

( \* ) Notice: Subject to any disclaimer, the term of this patent is extended or adjusted under 35 U.S.C. 154(b) by 0 days.

This patent is subject to a terminal disclaimer.

(21) Appl. No.: 19/192,177

(22) Filed: Apr. 28, 2025

(65) Prior Publication Data

US 2025/0258596 A1 Aug. 14, 2025

Related U.S. Application Data

(63) Continuation of application No. 18/239,134, filed on Aug. 29, 2023, now Pat. No. 12,293,068.

(51) Int. Cl.
| | |
|---|---|
| *G05D 1/246* | (2024.01) |
| *B25J 9/16* | (2006.01) |
| *B25J 11/00* | (2006.01) |
| *B25J 13/00* | (2006.01) |
| *G05D 1/00* | (2006.01) |

(Continued)

(52) U.S. Cl.
CPC ........ *G06F 3/04847* (2013.01); *B25J 9/1666* (2013.01); *B25J 11/0085* (2013.01); *B25J 13/00* (2013.01); *B25J 13/006* (2013.01);

*G05D 1/0219* (2013.01); *G05D 1/2295* (2024.01); *G05D 1/246* (2024.01); *G05D 1/6482* (2024.01); *G05D 1/2232* (2024.01); *G05D 2105/10* (2024.01); *Y10S 901/01* (2013.01)

(58) Field of Classification Search
None
See application file for complete search history.

(56) References Cited

U.S. PATENT DOCUMENTS

| | | | |
|---|---|---|---|
| 5,942,869 A | 8/1999 | Katou |
| 5,995,884 A | 11/1999 | Allan |

(Continued)

FOREIGN PATENT DOCUMENTS

DE 102017104691 A1 9/2018

OTHER PUBLICATIONS

Ackerman, Evan, IEEE Spectrum, This robot mops and vacuums your floors at the same time, (Year: 2013).

*Primary Examiner* — Ryan Rink

(57) ABSTRACT

Some aspects provide a method for instructing operation of a robotic floor-cleaning device based on the position of the robotic floor-cleaning device within a two-dimensional map of the workspace. A two-dimensional map of a workspace is generated using inputs from sensors positioned on a robotic floor-cleaning device to represent the multi-dimensional workspace of the robotic floor-cleaning device. The two-dimensional map is provided to a user on a user interface. A user may adjust the boundaries of the two-dimensional map through the user interface and select settings for map areas to control device operation in various areas of the workspace.

30 Claims, 5 Drawing Sheets

(51) Int. Cl.
G05D 1/223 (2024.01)
G05D 1/229 (2024.01)
G05D 1/648 (2024.01)
G06F 3/04847 (2022.01)
G05D 105/10 (2024.01)

(56) References Cited

U.S. PATENT DOCUMENTS

| | | | |
|---|---|---|---|
| 6,535,793 B2 | 3/2003 | Allard | |
| 6,667,592 B2 | 12/2003 | Jacobs | |
| 7,024,278 B2 | 4/2006 | Chiappetta | |
| 7,054,476 B2 | 5/2006 | Oosawa | |
| 7,769,492 B2 | 8/2010 | Wang | |
| 7,813,835 B2 | 10/2010 | Fujita | |
| 8,355,828 B2 | 1/2013 | Tolia | |
| 8,364,309 B1 | 1/2013 | Bailey | |
| 8,438,695 B2 | 5/2013 | Gilbert, Jr. | |
| 8,528,157 B2 | 9/2013 | Schnittman | |
| 8,798,834 B2 | 8/2014 | Jeong | |
| 8,903,590 B2 | 12/2014 | Jeon | |
| 9,008,835 B2 | 4/2015 | Dubrovsky | |
| 9,283,674 B2 | 3/2016 | Hoffman | |
| 9,298,183 B2 | 3/2016 | Artes | |
| 2003/0030399 A1 | 2/2003 | Jacobs | |
| 2003/0184436 A1 | 10/2003 | Seales | |
| 2006/0020369 A1 | 1/2006 | Taylor | |
| 2008/0311878 A1 | 12/2008 | Martin | |
| 2009/0082879 A1 | 3/2009 | Dooley | |
| 2009/0303042 A1 | 12/2009 | Song | |
| 2009/0306822 A1 | 12/2009 | Augenbraun | |
| 2010/0082193 A1 | 4/2010 | Chiapepetta | |
| 2011/0264305 A1 | 10/2011 | Choe | |
| 2011/0267280 A1 | 11/2011 | De Mers | |
| 2012/0229660 A1 | 9/2012 | Matthews | |
| 2013/0056032 A1 | 3/2013 | Choe | |
| 2013/0060379 A1 | 3/2013 | Choe | |
| 2013/0206177 A1 | 8/2013 | Burlutskiy | |
| 2014/0100736 A1 | 4/2014 | Kim | |
| 2014/0147240 A1 | 5/2014 | Noda | |
| 2014/0207280 A1 | 7/2014 | Duffley | |
| 2014/0303775 A1 | 10/2014 | Oh | |
| 2014/0320661 A1 | 10/2014 | Sankar | |
| 2015/0241984 A1 | 8/2015 | Itzhaik | |
| 2016/0193729 A1 | 7/2016 | Williams | |
| 2016/0282862 A1 | 9/2016 | Duffley | |
| 2016/0297072 A1 | 10/2016 | Williams | |
| 2017/0123421 A1 | 5/2017 | Kentley | |
| 2017/0273527 A1 | 9/2017 | Han | |
| 2017/0283092 A1 | 10/2017 | Brown | |
| 2018/0074508 A1* | 3/2018 | Kleiner | G05D 1/0274 |
| 2018/0200888 A1 | 7/2018 | Kim | |
| 2019/0061157 A1 | 2/2019 | Suvarna | |
| 2019/0208979 A1* | 7/2019 | Bassa | G05D 1/0274 |
| 2020/0027336 A1 | 1/2020 | Cho | |
| 2021/0138657 A1 | 5/2021 | Cui | |
| 2022/0291693 A1* | 9/2022 | Kim | A47L 11/4061 |

* cited by examiner

ROBOTIC FLOOR-CLEANING SYSTEM MANAGER

CROSS-REFERENCE TO RELATED APPLICATIONS

This application is a Continuation of U.S. Non-Provisional application Ser. No. 18/239,134 filed Aug. 29, 2023, which is a Continuation of U.S. Non-Provisional patent application Ser. No. 15/949,708, filed Apr. 10, 2018, which is a Continuation of U.S. Non-Provisional application Ser. No. 15/272,752, filed Sep. 22, 2016, which claims the benefit of U.S. Provisional Patent Application Nos. 62/235,408, filed Sep. 30, 2015, and 62/272,004, filed Dec. 28, 2015, each of which is hereby incorporated by reference.

FIELD OF THE DISCLOSURE

Some embodiments of the disclosure relate to a method and computer program product for graphical user interface (GUI) organization control for robotic floor-cleaning devices.

BACKGROUND

Robotic floor-cleaning devices are an increasingly popular solution for keeping floors clean in residential and commercial settings. Many robotic floor-cleaning systems generate maps of their environments using sensors to better navigate through the environment. However, such maps often contain errors and may not accurately represent the areas that a user may want the robotic floor-cleaning device to service. Further, users may want to customize operation of a robotic floor-cleaning device based on location within a map. For example, a user might want a robotic floor-cleaning device to service a first room with a steam cleaning function but service a second room without the steam cleaning function. A need exists for a method for users to adjust a robotic floor-cleaning map and control operations of a robotic floor-cleaning device based on location within the map.

SUMMARY

Some aspects provide a method and computer program product for graphical user interface (GUI) organization control of robotic floor-cleaning devices.

In some embodiments, a map of a workspace is generated from data acquired by sensors positioned on a robotic floor-cleaning device. In some embodiments, the map is sent to a user interface on a device such as a smartphone, computer, tablet, dedicated remote control, or any device that may display outputs from the system and receive inputs from a user. Through the user interface, a user may make changes to the map boundaries and select settings for the robotic floor-cleaning device to carry out in user-identified areas of the workspace. In some embodiments, user adjustments are sent from the user interface to the robotic floor-cleaning device to implement the changes.

DETAILED DESCRIPTION OF SOME EMBODIMENTS

Figure 1:
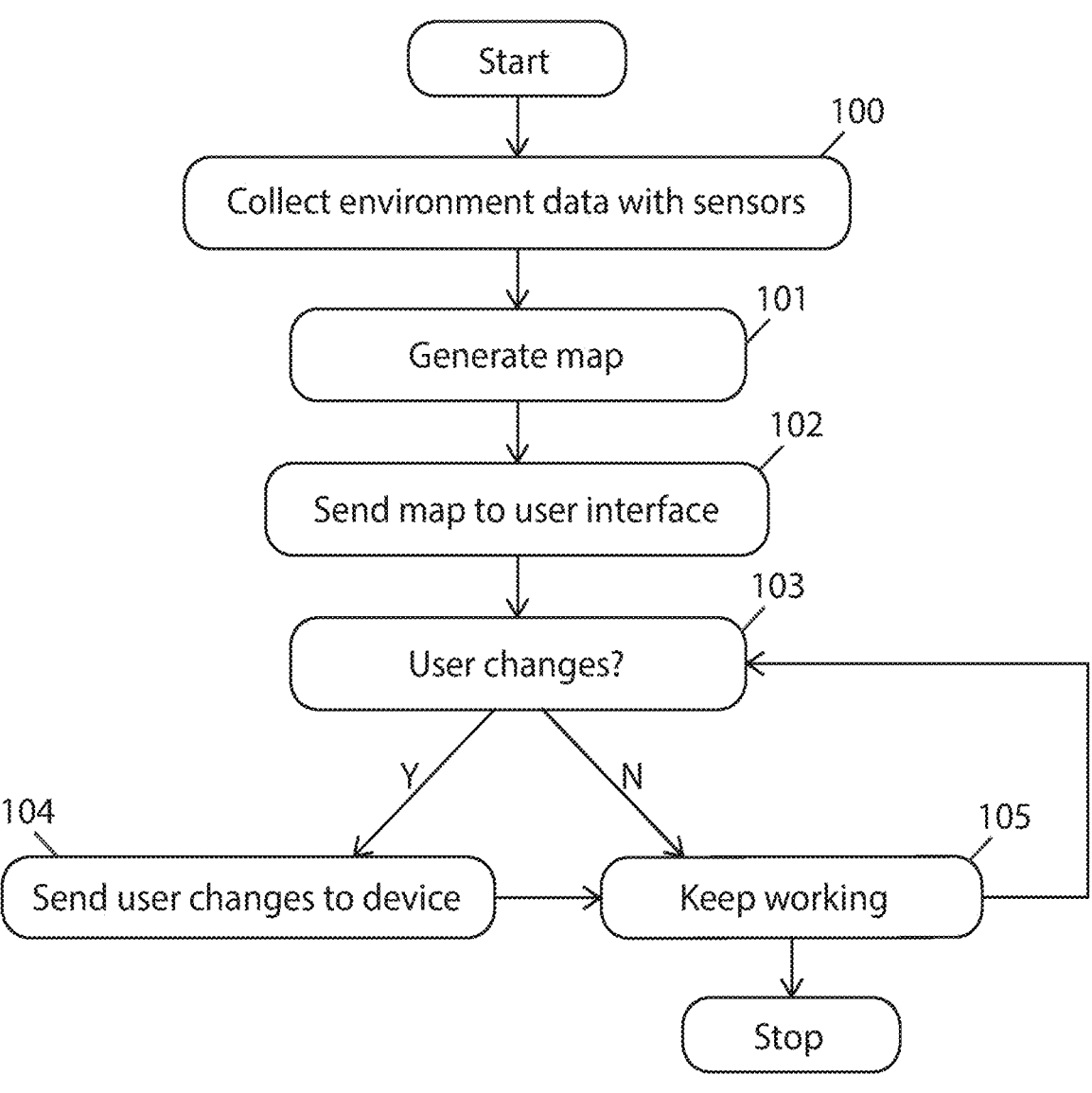
FIG. 1 illustrates a process for generating a map and making changes to the map through a user interface, according to some embodiments.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

The term "user interface" as used herein refers to an interface between a human user or operator and one or more devices that enables communication between the user and the device(s). Examples of user interfaces that may be employed in various implementations of the present invention include, but are not limited to, switches, buttons, dials, sliders, a mouse, keyboard, keypad, game controllers, track balls, display screens, various types of graphical user interfaces (GUIs), touch screens, microphones and other types of sensors that may receive some form of human-generated stimulus and generate a signal in response thereto.

Various methods currently exist for generating maps of an environment. Simultaneous localization and mapping (SLAM) techniques, for example, may be used to create a map of a workspace and keep track of a robotic device's location within the workspace.

In some embodiments, once a map is established, it may be sent to a user interface. Maps may be sent to a user interface at any stage; they do not need to be complete. In some embodiments, through the interface, a user may view the map and take any of a variety of actions. In embodiments, a user interface may be provided through a software application on a computer, tablet, smartphone, or a dedicated remote control. In some embodiments, a user may adjust or correct the map boundaries within the user interface by selecting all or part of a boundary line using a cursor, pointer, stylus, mouse, the user's finger, a button or buttons, or other input device on the user interface. In some embodiments, once a boundary line is selected, a user may be provided with various options, such as, but not limited to, deleting, trimming, rotating, elongating, redrawing, moving in a left direction, moving in a right direction, moving in an upward direction, moving in a downward direction, etc. In some embodiments, a user may be given the option to redraw a boundary line using a cursor, pointer, stylus, mouse, the user's finger, a button or buttons, or other input devices.

In some embodiments, maps generated by robotic devices may contain errors, be incomplete, or simply not reflect the areas that a user wishes a robotic floor-cleaning device to service. By adjusting the map, a user may improve the accuracy of the information that the robotic device has about its environment, thereby improving the device's ability to navigate through the environment. A user may, for example, extend the boundaries of a map in areas where the actual boundaries are further than those identified by the system, or trim boundaries where the system identified boundaries further than the actual or desired boundaries. Even in cases where a system creates an accurate map of an environment, a user may prefer to adjust the map boundaries to keep the device from entering some areas.

In some embodiments, data may be sent between the robotic floor-cleaning device and the user interface through one or more network communication connections. Any type of wireless network signals may be used, including, but not limited to, radio signals, Wi-Fi signals, or Bluetooth signals. In some embodiments, map data collected by sensors of the robotic floor-cleaning device is sent to the user interface, where a user may make adjustments and/or apply or adjust settings. In some embodiments, changes made by a user in the user interface are sent to the robotic floor-cleaning device through the one or more network communication connections.

In some embodiments, robotic floor-cleaning devices may have a plurality of tools that can be used concurrently or independently, such as, but not limited to, a suction tool, a mopping tool, and a UV light for killing bacteria. In some embodiments, robotic floor-cleaning devices may also have various settings, such as a deep cleaning setting, a regular cleaning setting, speed settings, movement pattern settings, cleaning frequency settings, etc. In some embodiments, a user is enabled to adjust all of these settings through the user interface. In some embodiments, a user may select with a cursor, pointer, stylus, mouse, the user's finger, a button or buttons, a keyboard, or other input devices any portion of the workspace and select one or more settings to be applied to the area.

FIG. 1 illustrates an example of a process for creating a two-dimensional map and utilizing an interactive user interface. In a first step 100, the system collects data about the environment with sensors positioned on the robotic floor-cleaning device. In a next step 101, the system generates a two-dimensional map of the workspace based on the collected data. As mentioned previously, any available methods may be used to create a two-dimensional map of the environment, including, but not limited to, simultaneous localization and mapping (SLAM) techniques. In some methods, measurement systems, such as LIDAR, are used to measure distances from the robotic device to the nearest obstacle in a 360 degree plane in order to generate a two-dimensional map of the area. In a next step 102, the two-dimensional map is sent to the user interface via one or more network communication connections. In a next step 103, the system checks for changes made by a user on the user interface. If any changes are detected (to either the map boundaries or the operation settings), the method proceeds to step 104 to send the user changes to the device. If no changes to the map boundaries or the operation settings are detected, the method proceeds to step 105 to continue working without any changes.

Figure 2:
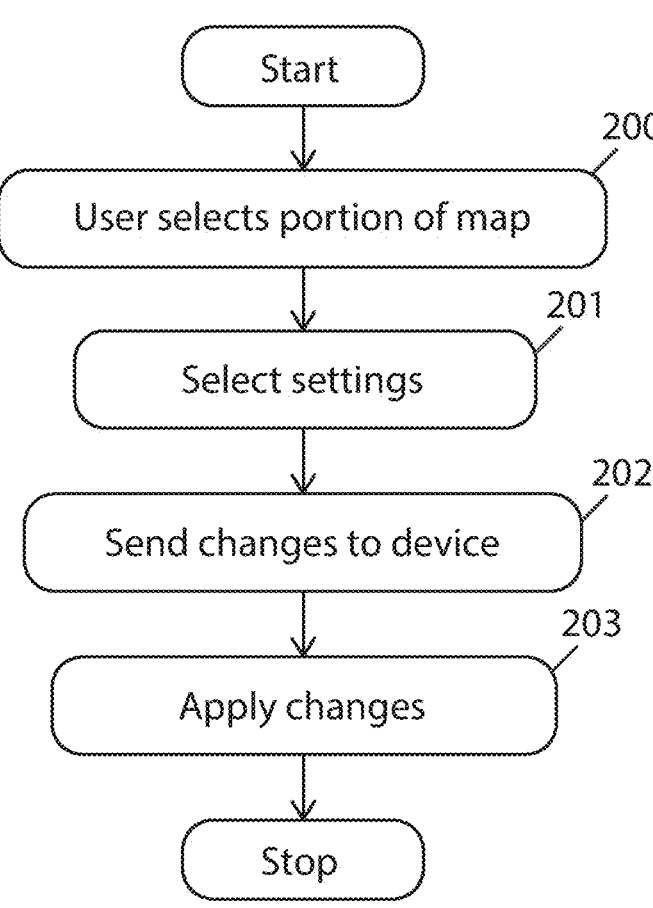
FIG. 2 illustrates a process for selecting settings for a robotic floor-cleaning device through a user interface, according to some embodiments.

FIG. 2 illustrates an example of a process for customizing robotic device operation through a user interface. In a first step 200, a user selects the area of the workspace map in which he or she wants to designate robotic device operation settings. A user may select any size area; the area selected could be comprised of a small portion of the workspace or could encompass the entire workspace.

In a next step 201, a user selects desired settings for the selected area. The particular functions and settings available may be dependent on the capabilities of the particular robotic floor-cleaning device in question. For example, in some embodiments, a user may select any of: cleaning modes, frequency of cleaning, intensity of cleaning, navigation methods, driving speed, etc. In a next step 202, the selections made by the user are sent to the robotic floor-cleaning device. In a next step 203, a processor of the robotic floor-cleaning device processes the received data and applies the user changes.

Figure 3A:
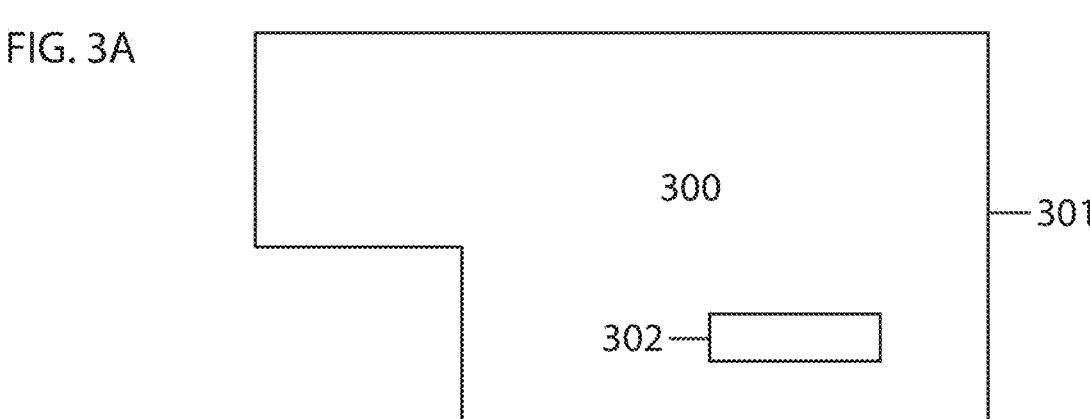
FIG. 3A illustrates an overhead view of actual boundaries of an exemplary workspace.
Figure 3B:
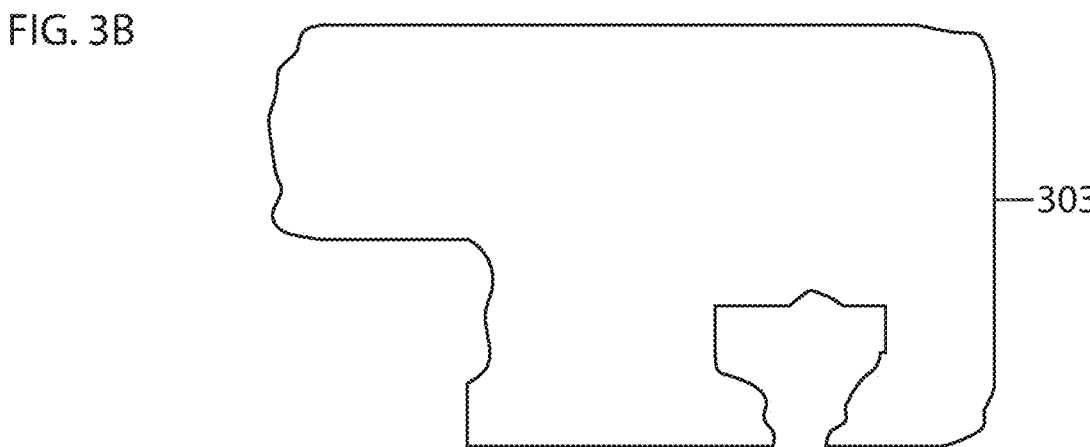
FIG. 3B illustrates an overhead view of a two-dimensional map of the exemplary workspace generated by a robotic floor-cleaning device.
Figure 3C:
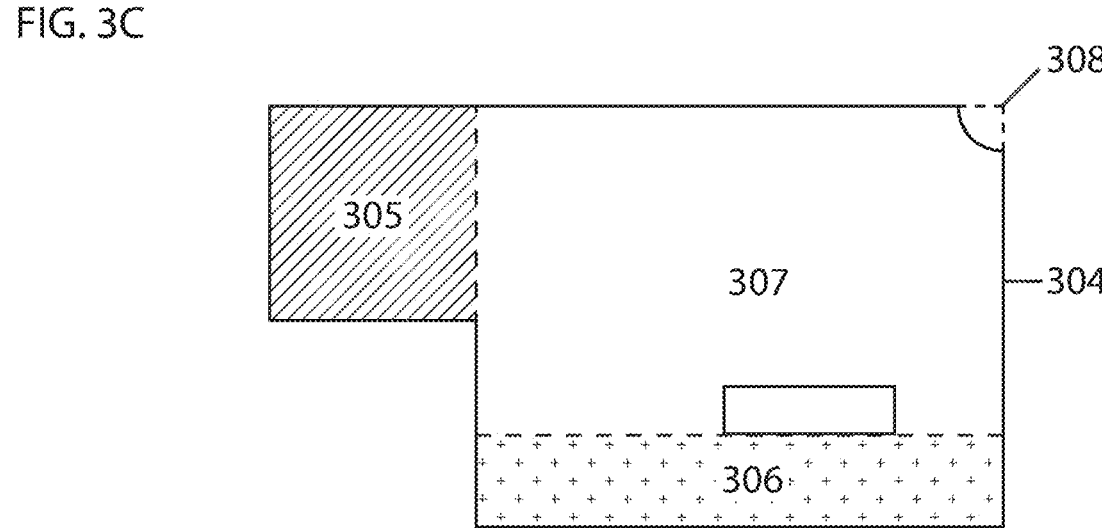
FIG. 3C illustrates an overhead view of a two-dimensional map of the exemplary workspace generated by a robotic floor-cleaning device and adjusted by a user.

FIG. 3A illustrates an overhead view of an exemplary workspace 300. This view shows the actual obstacles that may be detected by a robotic floor-cleaning device. The outer line 301 represents the walls of the workspace and the rectangle 302 represents a piece of furniture. FIG. 3B illustrates an overhead view of a two-dimensional map 303 created by a robotic floor-cleaning device of the workspace 300 shown in FIG. 3A. Because the methods for generating the map are not 100% accurate, the two-dimensional map generated is approximate and not perfect. A robotic floor-cleaning device may devise navigation plans based on the generated map, and thus performance may suffer as a result of imperfections in the generated map. A user may desire to correct the boundary lines to match the actual obstacles. FIG. 3C illustrates an overhead view of a user-adjusted two-dimensional map 304. By changing the boundary lines of the map 303 (shown in FIG. 3B) created by the robotic floor-cleaning device, a user is enabled to create a two-dimensional map of the workspace 300 (shown in FIG. 3A) that accurately identifies obstacles and boundaries in the workspace. Furthermore, as discussed previously, a user may identify areas within the two-dimensional map to be treated in specific ways. By delineating a portion 305 of the map, a user may select settings for that area. For example, a user may identify the area 305 and select weekly cleaning, as opposed to daily or standard cleaning, for that area. In a like manner, a user may define the area 306 and turn on a mopping function for that area. The remaining area 307 may be treated in a default manner. Additionally, in adjusting the boundary lines of the two-dimensional map, a user is permitted to create boundaries anywhere desired, regardless of whether an actual boundary exists in the workspace. In the example shown, the boundary line in the corner 308 has been redrawn to exclude the area near the corner. The robotic floor-cleaning device will thus be prevented from entering the area. This may be useful for keeping a robotic floor-cleaning device out of areas that a user does not want the device to service. For example, a user might exclude areas from a map with fragile objects, pets, cables or wires, etc.

Figure 4:
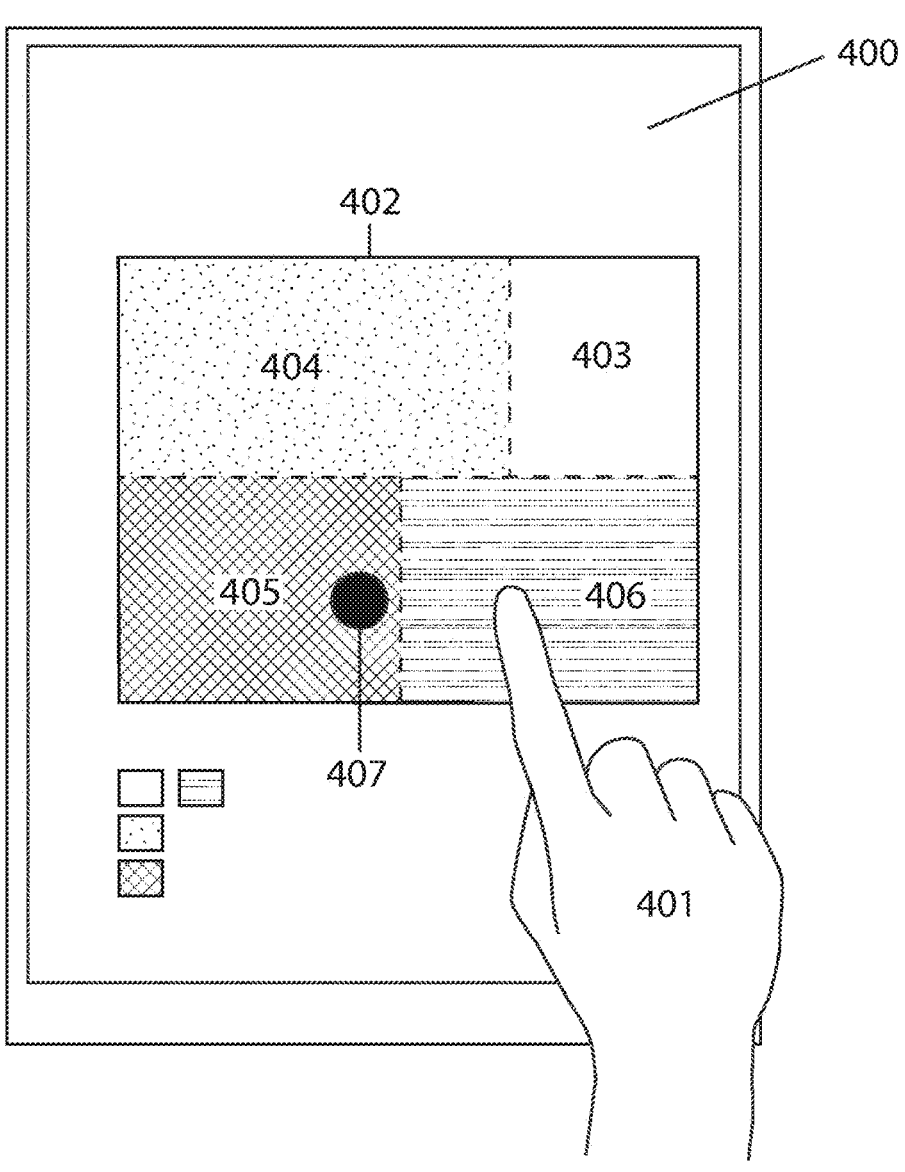
FIG. 4 illustrates an example of a user providing inputs on a user interface to customize a robotic floor-cleaning job.

FIG. 4 illustrates an example of a user interface 400. In the example shown, the user 401 has delineated sections of the workspace 402 to be serviced in different ways by the robotic floor-cleaning device 407. The user has delineated four sections: 403, 404, 405, and 406. The user may select the settings of the robotic floor-cleaning device within each section independently of the other sections using the user interface. In the example shown, a user uses his or her finger to manipulate the map through a touchscreen; however, various other methods may be employed depending on the hardware of the device providing the user interface.

Figure 5:
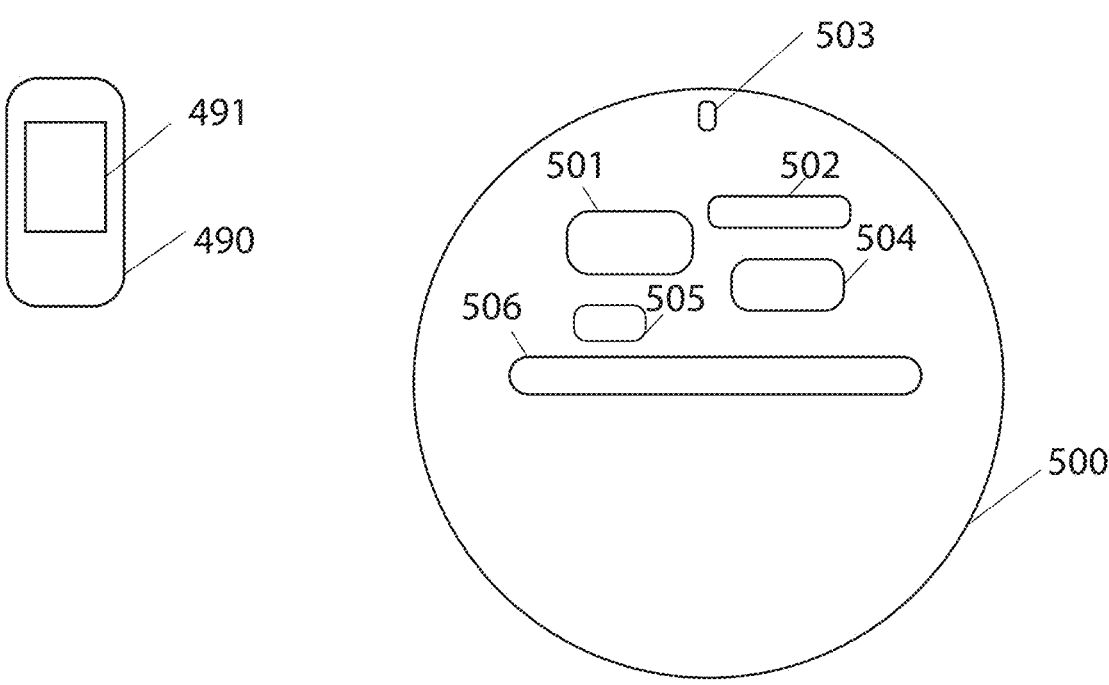
FIG. 5 is a schematic diagram of an example of a robot with which the present techniques may be implemented.

FIG. 5 depicts an example of a robotic device 500 with processor 501, memory 502, sensor 503, actuator 504, timer 505 and cleaning tool 506 (e.g., suction tool, mopping tool, ultraviolet light, etc.). In some embodiments, the robot may include the features of a robot described herein. In some embodiments, program code stored in the memory 502 and executed by the processor 501 may effectuate the operations described herein.

Additionally, in some embodiments, a real-time robotic floor-cleaning device manager may be provided on the user interface to allow a user to instruct the real-time operation of the robotic floor-cleaning device regardless of the device's location within the two-dimensional map. In some embodiments, instructions may include any of turning on or off a mop tool, turning on or off a UV light tool, turning on or off a suction tool, turning on or off an automatic shutoff timer, increasing speed, decreasing speed, driving to a user-identified location, turning in a left or right direction, driving forward, driving backward, stopping movement, commencing one or a series of movement patterns, or any other preprogrammed action.

The invention claimed is:

1. A method for at least partially controlling operations of a robotic floor cleaner with an application, installed and executed on a smartphone, the method comprising instructions for both the application executed on the smartphone and the robotic floor cleaner responsive to the application, the method comprising:

a method for a robotic floor cleaner to:

sense data indicative of locations of objects in an environment in which the robotic floor cleaner is configured to move, measure distances from the robotic device to nearest obstacles with a LIDAR, identify free space and objects within the environment, and create from sensed data comprising measured distances in a 360-degree plane, a two-dimensional map of the environment with at least an outer boundary line associated with actual wall boundaries of the environment;

transmit, with a network communication connection utilizing radio signals, the map of the environment; and clean floor surfaces by operating a mopping tool of the robotic floor cleaner and a vacuuming tool of the robotic floor cleaner concurrently, independently, or according to selections or preferences of a user provided through an application on a smartphone corresponding to the robotic floor cleaner;

and a method for the application corresponding to the robotic floor cleaner comprising one or more tangible, non-transitory, computer-readable media storing instructions that, when executed on the smartphone, effectuate operations comprising:

presenting to the user, with the application, a user interface for the robotic floor cleaner, the user interface comprising the map of the environment created by the robotic floor cleaner;

receiving, with the application, via the user interface, a user input to add a boundary line anywhere on the map of the environment where an actual boundary does not exist, by the user touching with a finger a location on a screen of the smartphone;

receiving, with the application, via the user interface, a user input to adjust the boundary line by:

moving the boundary line left on the map;

moving the boundary line right on the map;

moving the boundary line up on the map; and moving the boundary line down on the map;

wherein the added boundary line designates a division for segmenting the map of the environment into two or more areas, wherein robotic operations from a plurality of robotic operations are selected to be performed by the robotic floor cleaner within different areas separated by the added boundary; and the method further comprising:

transmitting the user input, via the network communication connection, to the robotic floor cleaner for cleaning the floor surface in accordance with the user input, wherein the robotic floor cleaner is configured to clean the floor surfaces in accordance with the received user input.

2. The method of claim 1, the operations further comprising:

cleaning the floor surfaces by operating the mopping tool of the robotic floor cleaner in a first room, and cleaning the floor surfaces without operating the mopping tool of the robotic floor cleaner in a second room.

3. The method of claim 1, wherein the network communication connection utilizing radio signals comprises wireless network signals.

4. The method of claim 1, wherein the application corresponding to the robotic floor cleaner, further presents to the user, via the user interface, a status of the robotic floor cleaner, a battery level of the robotic floor cleaner, a progress of a robotic operation, and a firmware version of the robotic floor cleaner.

5. A system for cleaning a floor surface by a robotic floor cleaner in accordance with preferences of a user, the user preferences provided through an application corresponding to the robotic floor cleaner, installed and executed on a tablet computing device, or a smartphone, the system comprising:

a robotic floor cleaner, comprising:

a mopping tool;

a vacuuming tool;

a network communication connection utilizing radio signals; and a sensor;

wherein the robotic floor cleaner is configured to:

sense data indicative of locations of objects in an environment in which the robotic floor cleaner is configured to move;

identify free space and objects in the environment and create from sensed data comprising measured distances, a two-dimensional map of the environment with at least an outer boundary line associated with actual wall boundaries of the environment;

clean the floor surface by operating the mopping tool and the vacuuming tool concurrently, or independently, according to selections or preferences of the user provided through an application corresponding to the robotic floor cleaner;

one or more tangible, non-transitory, computer-readable media storing instructions that, when installed and executed on the tablet computing device or the smartphone, effectuate operations comprising:

presenting to the user, with the application, a user interface for the robotic floor cleaner, the user interface comprising the map of the environment created by the robotic floor cleaner based on the sensed data from the sensor of the robotic floor cleaner;

receiving, with the application, via the user interface, a user input to add a boundary line anywhere on the map of the environment where an actual boundary does not exist within the environment, by the user touching with a finger a location on a screen of the tablet computing device or the smartphone;

receiving, with the application, via the user interface, a user input to adjust the boundary line by:

moving the boundary line left on the map;

moving the boundary line right on the map;

moving the boundary line up on the map; and moving the boundary line down on the map;

and transmitting the user input, via the network communication connection, to the robotic floor cleaner for cleaning the floor surface in accordance with the user input, wherein:

the user provides preferences of the user in relation to the added boundary line; and the robotic floor cleaner is configured to clean the floor surfaces in accordance with the received user input.

6. The system of claim 5, the operations further comprising:

receiving, with the application, via the user interface, a user input to add more boundary lines anywhere on the map of the environment.

7. The system of claim 5, the operations further comprising:

receiving, with the application, via the user interface, a user input to delineate a section of the map of the environment.

8. The system of claim 5, the operations further comprising:

receiving, with the application, via the user interface, a user input to adjust the boundary line by rotating the boundary line.

9. The system of claim 8, the operations further comprising:

receiving, with the application, via the user interface, a user input to further adjust the added boundary line by elongating or trimming the added boundary line.

10. The system of claim 5, wherein the adding of a boundary line where an actual boundary does not exist designates a specification for a boundary, based on which the map of the environment is changed, in order for the robotic floor cleaner to observe a virtual barrier, wherein the robotic floor cleaner avoids crossing the virtual barrier.

11. The system of claim 5, wherein the added boundary line designates a division for segmenting the map of the environment into two or more areas, wherein robotic operations from a plurality of robotic operations are selected to be executed by the robotic floor cleaner within different areas separated by the added boundary.

12. A system for cleaning a floor surface with a robotic floor cleaner treating specific sections of the floor surface of an environment in particular ways based on a user input provided by a user through an application corresponding to the robotic floor cleaner, installed and executed on a smartphone, the system comprising:

a robotic floor cleaner, comprising:

a plurality of cleaning tools to provide a plurality of robotic operations for a user to select from, wherein each of the plurality of robotic operations utilizes a combination of cleaning tools concurrently, independently, or with a plurality of settings or intensity, wherein at least a first tool of the robotic floor cleaner is a suction tool, and at least a second tool of the robotic floor cleaner is a mopping tool;

a sensor configured to measure distances and sense data indicative of locations of obstacles and free spaces in an environment in which the robotic floor cleaner is configured to move; and a network communication connection utilizing radio signals;

wherein the robotic floor cleaner is configured to perform operations, comprising:

generating, from the measured distances obtained by the sensor of the robotic floor cleaner, a two-dimensional map of the environment with at least an outer boundary line representing actual boundaries of the environment; and transferring the map of the environment through the network communication connection; and an application, corresponding to the robotic floor cleaner, comprising one or more tangible, non-transitory, computer-readable media storing instructions that, when installed and executed on a smartphone, effectuate operations comprising:

obtaining, on the smartphone, the map of the environment;

presenting to the user, with the application corresponding to the robotic floor cleaner, a user interface for the robotic floor cleaner comprising at least the map of the environment on a screen of the smartphone;

receiving, with the application corresponding to the robotic floor cleaner, via the user interface, a user input upon the user touching a location on the screen of the smartphone with a finger to manipulate the map of the environment in order to:

delineate a portion of the map of the environment in order to select a robotic operation for an area of the environment;

create a boundary line where an actual boundary does not exist in order to prevent the robotic floor cleaner from entering an area of the environment; and adjust the created boundary line by rotating the boundary line, or moving the boundary line in a left direction, a right direction, an upward direction, and a downward direction;

receiving, with the application corresponding to the robotic floor cleaner, via the user interface, a user input indicating a selection from the plurality of robotic operations; and receiving, with the application corresponding to the robotic floor cleaner, via the user interface, a user input indicating a schedule for the robotic floor cleaner;

wherein:

the received user input data, with the application corresponding to the robotic floor cleaner, via the user interface, is sent to the robotic floor cleaner for execution; and the robotic floor cleaner is configured to perform operations according to the received user input.

13. The system of claim 12, wherein the robotic floor cleaner utilizes a simultaneous localization and mapping technique to generate the map of the environment.

14. The system of claim 12, wherein the sensor is a LIDAR that measures distances in a 360-degree plane.

15. The system of claim 12, wherein the plurality of robotic operations for the user to select from comprises:

a deep cleaning operation comprising a high-intensity vacuuming;

a regular cleaning operation comprising a medium-intensity vacuuming;

a light cleaning operation comprising a low-intensity vacuuming;

a deep cleaning operation comprising a high-intensity vacuuming and mopping;

a regular cleaning operation comprising a medium-intensity vacuuming and mopping;

a light cleaning operation comprising a low-intensity vacuuming and mopping; and mopping.

16. The system of claim 12, wherein the robotic floor cleaner is further configured to perform operations comprising:

moving to a user-identified location based on the user input delineating a portion of the map of the environment; and executing a user-selected robotic operation in an area represented by the delineated portion of the map of the environment.

17. The system of claim 16, wherein the user-identified location comprises at least one room within the map of the environment.

18. The system of claim 16, wherein the user-selected robotic operations of the robotic floor cleaner comprise a series of movements of the robotic floor cleaner in a pattern within the user-identified location.

19. The system of claim 18, wherein the application corresponding to the robotic floor cleaner effectuates operations further comprising:

receiving, with the application corresponding to the robotic floor cleaner, via the user interface, a user input in relation to the movements of the robotic floor cleaner comprising:

turning the robotic floor cleaner; and driving the robotic floor cleaner forward or backward.

20. The system of claim 12, wherein the robotic floor cleaner is configured to clean the floor surface of the environment while concurrently generating the map of the environment.

21. The system of claim 12, wherein the radio signals are wireless network signals.

22. The system of claim 12, further comprising:

presenting to the user, with the application corresponding to the robotic floor cleaner, via the user interface, a status of the robotic floor cleaner, a battery level of the robotic floor cleaner, and progress statistics of a robotic operation.

23. The system of claim 13, further comprising:

presenting to the user, with the application corresponding to the robotic floor cleaner, via the user interface, a firmware version of the robotic floor cleaner.

24. A system for robotically cleaning a floor surface with a robotic floor cleaner operating a first cleaning operation in a first section of the floor surface and operating a second cleaning operation in a second section of the floor surface, based on a user input delineating the first and the second section on a two-dimensional map of the environment created by the robotic floor cleaner and presented on a smartphone executing an application corresponding with the robotic floor cleaner, the system comprising:

a robotic floor cleaner configured to clean floor surfaces, comprising:

a mopping tool;

a vacuuming tool;

a sensor;

a network communication connection utilizing wireless signals;

wherein the robotic floor cleaner is configured to:

measure distances, with a sensor of the robotic floor cleaner, and sense data indicative of locations of obstacles, and free spaces in an environment in which the robotic floor cleaner is configured to move, and generate a two-dimensional map of the environment based on the measured distances;

one or more tangible, non-transitory, computer-readable media storing instructions that, when installed and executed on a smartphone, effectuate operations comprising:

presenting to the user, with the application, a user interface for the robotic floor cleaner comprising the map of the environment generated by the robotic floor cleaner;

receiving, with the application, via the user interface, a user input to delineate a first section of the environment on the map by the user touching with a finger a location on a screen of the smartphone;

receiving, with the application, via the user interface, a user input to delineate a second section of the environment on the map by the user touching with a finger a location on the screen of the smartphone;

receiving, with the application, via the user interface, a user input indicating a selection of a first cleaning operation for the first delineated section;

receiving, with the application, via the user interface, a user input indicating a selection of a second cleaning operation for the first delineated section, wherein:

the first cleaning operation is one of a:

high-intensity vacuuming;

regular-intensity vacuuming; or low-intensity vacuuming;

and the second cleaning operation is one of a:

high-intensity vacuuming with mopping;

regular-intensity vacuuming with mopping; or low-intensity vacuuming with mopping;

transmitting, from the application, via the network communication connection, the user input;

wherein the robotic floor cleaner is configured to perform operations in accordance with the received user input.

25. The system of claim 24, the operations further comprising:

receiving, with the application, via the user interface, a user input to delineate a third section of the environment on the map by the user touching with a finger a location on the screen of the smartphone.

26. The system of claim 25, wherein the robotic floor cleaner is further configured to perform a third cleaning operation in the third delineated section of the environment, wherein the third cleaning operation is mopping.

27. The system of claim 24, the operations further comprising:

executing, with the application, via the user interface, a loop in which a determination is made in each iteration of the loop as to whether a user input relating to a change in the map of the environment is received by the application.

28. The system of claim 27, the operations further comprising:

transmitting the change in the map of the environment to the robotic floor cleaner upon the application corresponding to the robotic floor cleaner making the determination of a received change; and operating, with the robotic floor cleaner, a robotic operation based on the received change.

29. The system of claim 24, the operations further comprising:

presenting to the user, with the application, via the user interface, steps for generating the map of the environment and making changes to the map of the environment; and presenting to the user, with the application, via the user interface, steps for selecting settings for the robotic floor cleaner.

30. The system of claim 24, the operations further comprising:

presenting, with the application, via the user interface, an incomplete map of the environment based on the sensed data obtained by the sensor of the robotic floor cleaner as the robotic floor cleaner moves within the environment to generate the map.

* * * * *